United States Patent
Kohda (10) Patent No.: US 6,624,436 B1
(45) Date of Patent: Sep. 23, 2003

(54) STIMULABLE PHOSPHOR SHEET

(75) Inventor: Katsuhiro Kohda, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/675,009

(22) Filed: Sep. 29, 2000

(30) Foreign Application Priority Data

Sep. 29, 1999 (JP) .......................................... 11/276581

(51) Int. Cl.⁷ .............................................. G03B 42/08
(52) U.S. Cl. ................................... 250/581; 250/484.4
(58) Field of Search .............................. 250/581, 582, 250/583, 584, 484.4, 486.1

(56) References Cited

U.S. PATENT DOCUMENTS

| | | |
|---|---|---|
| 4,346,295 A | 8/1982 | Tanaka et al. |
| 4,400,619 A | 8/1983 | Kotera et al. |
| 4,626,688 A * | 12/1986 | Barnes .................... 250/361 R |
| 4,752,557 A | 6/1988 | Tsuchino et al. |
| 4,801,806 A * | 1/1989 | Nakamura et al. ....... 250/484.1 |
| 4,855,598 A | 8/1989 | Ohgoda et al. |
| 5,227,253 A | 7/1993 | Takasu et al. |
| 5,661,306 A * | 8/1997 | Arakawa .................. 250/484.4 |
| 6,072,855 A * | 6/2000 | Arakawa .................. 378/98.11 |

FOREIGN PATENT DOCUMENTS

| | | |
|---|---|---|
| JP | 5612599 | 2/1981 |
| JP | 5745475 | 3/1982 |
| JP | 6236599 | 2/1987 |
| JP | 2193100 | 7/1990 |
| JP | 6130197 | 5/1994 |

* cited by examiner

Primary Examiner—Constantine Hannaher
Assistant Examiner—Timothy Moran
(74) Attorney, Agent, or Firm—Birch, Stewart, Kolasch & Birch, LLP (57) ABSTRACT

A stimulable phosphor sheet comprises an intermediate layer constituted of a substance, which absorbs low energy components of radiation and transmits at least light having predetermined wavelengths, and stimulable phosphor layers, which are overlaid respectively on two surfaces of the intermediate layer. The substance contains a bismuth compound or at least one lead compound selected from the group consisting of $PbF_2$, $2PbCO_3 \cdot Pb(OH)_2$, $PbTe$, and $PbWO_4$. The intermediate layer is chemically stable, has a high capability of separating energy distributions, and acts such that an energy subtraction image having good image quality is obtained from energy subtraction processing.

13 Claims, 3 Drawing Sheets

STIMULABLE PHOSPHOR SHEET

BACKGROUND OF THE INVENTION

1. Field of the Invention

This invention relates to a stimulable phosphor sheet. This invention particularly relates to a stimulable phosphor sheet for use in an energy subtraction processing technique for radiation images, wherein an image signal is obtained which represents an image of a specific structure or part of an object represented by the radiation images.

2. Description of the Related Art

It has been proposed to use stimulable phosphors in radiation image recording and reproducing systems. Specifically, a sheet provided with a layer of the stimulable phosphor (hereinafter referred to as a stimulable phosphor sheet) is firstly exposed to radiation, which carries image information of an object, such as a human body. In this manner, a radiation image of the object is stored on the stimulable phosphor sheet. The stimulable phosphor sheet, on which the radiation image has been stored, is then exposed to stimulating rays, which cause the stimulable phosphor sheet to emit light in proportion to the amount of energy stored thereon during its exposure to the radiation. The light emitted by the stimulable phosphor sheet, when it is exposed to the stimulating rays, is photoelectrically detected and converted into an electric image signal. The electric image signal is then processed, and the processed image signal is utilized for reproducing a visible image, which has good image quality and can serve as an effective tool in, particularly, the efficient and accurate diagnosis of an illness. The visible image finally obtained may be reproduced in the form of a hard copy or may be displayed on a display device, such as a cathode ray tube (CRT) display device. In the radiation image recording and reproducing systems, the stimulable phosphor sheet temporarily stores the radiation image, such that a final visible image can be reproduced on a final recording medium. For the sake of economy, therefore, it is desirable that the stimulable phosphor sheet be used repeatedly.

In order that the stimulable phosphor sheet may be reused in the manner described above, any energy remaining on the stimulable phosphor sheet after the image signal has been detected from the stimulable phosphor sheet may be erased. For such purposes, as disclosed in, for example, U.S. Pat. No. 4,400,619 or Japanese Unexamined Patent Publication No. 56(1981)-12599, the stimulable phosphor sheet may be exposed to erasing light or heat, and energy remaining on the stimulable phosphor sheet may thereby be released. The erased stimulable phosphor sheet can then be reused to record a next radiation image.

Also, subtraction processing techniques for radiation images have heretofore been known. With the subtraction processing techniques for radiation images, an image corresponding to a difference between a plurality of radiation images of an object, which have been recorded under different conditions, is obtained. Specifically, a plurality of the radiation images, which have been recorded under different conditions, are read out at predetermined sampling intervals, and a plurality of image signals thus detected are converted into digital image signals which represent the radiation images. The image signal components of the digital image signals, which image signal components represent the image information recorded at corresponding sampling points in the radiation images, are then subtracted from each other. A difference signal is thereby obtained which represents the image of a specific structure or part of the object represented by the radiation images.

Basically, subtraction processing is carried out with either the so-called temporal (time difference) subtraction processing technique or the so-called energy subtraction processing technique. In the temporal subtraction processing technique, in order for the image of a specific structure of an object (for example, in cases where the object is a human body, the image of a blood vessel) to be extracted from the image of the whole object, the image signal representing a radiation image, which has been obtained without injection of contrast media, is subtracted from the image signal representing a radiation image, in which the image of the specific structure (for example, the blood vessel) of the object has been enhanced by the injection of contrast media. In the energy subtraction processing technique, such characteristics are utilized that a specific structure of an object exhibits different levels of radiation absorptivity with respect to radiation having different energy distributions. Specifically, an object is exposed to several kinds of radiation with different energy distributions. Alternatively, the energy distribution of the radiation, which carries image information of an object, is changed after the radiation has been irradiated onto one of a plurality of stimulable phosphor sheets, after which the radiation impinges upon the second stimulable phosphor sheet. In this manner, a plurality of radiation images, in which different images of a specific structure are embedded, are formed with the radiation having different energy distributions. Thereafter, the image signals representing the plurality of the radiation images are weighted appropriately and subjected to a subtraction process in order to extract the image of the specific structure.

The subtraction processing is extremely effective, particularly for medical diagnosis, and electronics research has continued to develop improved subtraction processing techniques.

In the aforesaid radiation image recording and reproducing systems utilizing a stimulable phosphor sheet, the radiation image stored on the stimulable phosphor sheet is read out directly as an electric image signal. Therefore, with the radiation image recording and reproducing systems, the subtraction processing described above can readily be carried out. In cases where the energy subtraction processing is to be carried out, radiation images may be stored on two stimulable phosphor sheets such that the parts of the radiation images, which parts correspond to a specific structure, are different in the two radiation images. For such purposes, a technique may be employed, wherein the operation for recording a radiation image is performed two times with two kinds of radiation having different energy distributions. Alternatively, a technique may be employed, wherein a filter, which is constituted of a metal, or the like, and which absorbs low energy components of radiation, is located between two stimulable phosphor sheets, and the two stimulable phosphor sheets are simultaneously exposed to radiation, which carries the image information of the object. However, with the former technique, the problems occur in that the operation for recording the radiation image must be performed two times, and an artifact is apt to occur due to movement of the object between the two radiation image recording operations. Also, with the former technique, radiation irradiating means must be adjusted for each of the radiation image recording operations, and therefore the operation characteristics are bad. With the latter technique, the problems occur in that the filter must be located between the stimulable phosphor sheets, and therefore the processing of the stimulable phosphor sheets at the time of the image recording and the image readout is not easy to perform.

In order for the aforesaid problems to be eliminated, there has been proposed a stimulable phosphor sheet comprising a substrate constituted of a substance, which absorbs low energy components of radiation, and stimulable phosphor layers, which are overlaid respectively on the two surfaces of the substrate. Such a stimulable phosphor sheet is disclosed in, for example, U.S. Pat. No. 4,855,598. In cases where the proposed stimulable phosphor sheet is exposed to radiation carrying image information of an object, radiation images of the object are stored respectively on the two stimulable phosphor layers of the stimulable phosphor sheet. Scanning with the stimulating rays is performed successively on each of the two surfaces of the stimulable phosphor sheet, and light emitted by one of the two surfaces of the stimulable phosphor sheet and light emitted by the other surface of the stimulable phosphor sheet are successively detected photoelectrically. Two image signals are thereby obtained successively. A subtraction process is then performed on the two image signals. In this manner, a subtraction image can be efficiently obtained with a single image recording operation.

With the stimulable phosphor sheet proposed in U.S. Pat. No. 4,855,598, the stimulable phosphor layers are overlaid respectively on the two surfaces of the substrate. However, in cases where the image signals are to be detected from the proposed stimulable phosphor sheet, the two surfaces of the stimulable phosphor sheet must be scanned successively with two independent scanning operations, and the light emitted by one of the two surfaces of the stimulable phosphor sheet and the light emitted by the other surface of the stimulable phosphor sheet must be detected successively. Therefore, the operation characteristics of the image read-out operations are bad. Also, it is necessary for position matching between the thus obtained two image signals to be performed. The position matching between the two image signals is not easy to perform. Accordingly, it may be considered to locate two independent stimulating ray sources respectively on the sides of the two surfaces of the stimulable phosphor sheet and to simultaneously perform the image readout from the two surfaces of the stimulable phosphor sheet. However, in such cases, the size of the radiation image read-out apparatus for performing the image read-out operation cannot be kept small, and the cost of the radiation image read-out apparatus cannot be kept low.

In order for the problems described above to be solved, an energy subtraction processing method for radiation images, wherein radiation images are recorded with a single image recording operation and a subtraction image is capable of being obtained with a single image read-out operation utilizing a single stimulating ray source, and a stimulable phosphor sheet for use in the energy subtraction processing method have been proposed in, for example, Japanese Unexamined Patent Publication No. 6(1994)-130197. With the proposed energy subtraction processing method, a stimulable phosphor sheet comprising a substrate (an energy distribution separating filter layer) constituted of a substance, which absorbs low energy components of radiation and transmits at least stimulating rays having predetermined wavelengths, and stimulable phosphor layers, which are overlaid respectively on two surfaces of the energy distribution separating filter layer, is utilized. Also, with a single image recording operation, radiation images are stored on the stimulable phosphor layers and with radiation having different energy distributions. Thereafter, two image signals are obtained with a technique for detecting light emitted from two surfaces of a stimulable phosphor sheet and thereby detecting two image signals from the two surfaces of the stimulable phosphor sheet, which technique is disclosed in, for example, U.S. Pat. No. 4,346,295. Specifically, in accordance with the disclosed technique for detecting light emitted from two surfaces of a stimulable phosphor sheet and thereby detecting two image signals from the two surfaces of the stimulable phosphor sheet, stimulating rays are produced by a single stimulating ray source and caused to scan one surface of the stimulable phosphor sheet, and light emitted from one of the stimulable phosphor layers of the stimulable phosphor sheet and light emitted from the other stimulable phosphor layer are simultaneously detected. A subtraction process is then performed on the thus obtained two image signals. With the energy subtraction processing method proposed in Japanese Unexamined Patent Publication No. 6(1994)-130197, the time required to read out the radiation images having been stored on the stimulable phosphor layers can be kept short. Also, a subtraction image having a high resolution can be obtained efficiently from the two image signals, which represent the radiation images such that no deviation in position occurs between the radiation images.

In Japanese Unexamined Patent Publication No. 6(1994)-130197, as the substance employed in the energy distribution separating filter layer of the stimulable phosphor sheet, which substance absorbs low energy components of radiation and transmits light having predetermined wavelengths, a substance comprising a polymeric binder and fine particles of lead glass, $PbO_2$, or $TiO_2$ dispersed in the polymeric binder is exemplified. The energy distribution separating filter layer absorbs the low energy components of radiation and transmits the light having wavelengths falling within the wavelength range of the stimulating rays. Therefore, it is firstly necessary for the energy distribution separating filter layer to have a high capability of separating energy distributions. Also, as described above, the stimulable phosphor sheet is used repeatedly to record a radiation image. Therefore, it is desired that the substance, which absorbs low energy components of radiation and transmits light having predetermined wavelengths, undergoes no change in characteristics with respect to the stimulating rays and the light, which is emitted by the stimulable phosphor sheet, when the stimulable phosphor sheet is used repeatedly, i.e. that the substance is chemically stable.

However, in cases where $PbO_2$ is employed in the energy distribution separating filter layer, $PbO_2$ decomposes little by little and becomes colored. Therefore, $PbO_2$ is not suitable for long-term use. Also, it is not easy to ensure long-term chemical stability of $PbO_2$, and $PbO_2$ deteriorates little by little with the passage of time. As a result, $PbO_2$ absorbs a laser beam acting as the stimulating rays or the light emitted by the stimulable phosphor sheet. In such cases, the problems occur in that a stimulable phosphor layer of the stimulable phosphor sheet (in particular, the stimulable phosphor layer formed on the surface of the energy distribution separating filter layer, which surface is opposite to the stimulating ray irradiation side surface of the energy distribution separating filter layer) cannot be stimulated sufficiently, or that the light emitted by the stimulable phosphor sheet does not emanate sufficiently from the surface of the stimulable phosphor sheet. Accordingly, in cases where an energy subtraction image is formed from the image signals having been detected from the two surfaces of the stimulable phosphor sheet, it often occurs that an energy subtraction image having good image quality cannot be obtained and a medical diagnosis cannot be made accurately.

In cases where $TiO_2$ is employed in the energy distribution separating filter layer, if the thickness of the energy distribution separating filter layer is small, a high capability of separating energy distributions cannot be obtained. Also, if the thickness of the energy distribution separating filter layer is large, a high capability of separating energy distributions can be obtained. However, in such cases, due to the large thickness of the energy distribution separating filter layer, the intensity of the laser beam reduces markedly when the laser beam passes through the energy distribution separating filter layer. Therefore, the laser beam cannot readily reach the stimulable phosphor layer formed on the surface of the energy distribution separating filter layer, which surface is opposite to the stimulating ray irradiation side surface of the energy distribution separating filter layer. As a result, light having a high intensity cannot be emitted from the stimulable phosphor layer formed on the surface of the energy distribution separating filter layer, which surface is opposite to the stimulating ray irradiation side surface of the energy distribution separating filter layer. In addition, since the thickness of the energy distribution separating filter layer is large, the laser beam diffuses markedly when the laser beam passes through the energy distribution separating filter layer. Accordingly, an image having a high sharpness cannot be obtained from the image signal detected from the stimulable phosphor layer formed on the surface of the energy distribution separating filter layer, which surface is opposite to the stimulating ray irradiation side surface of the energy distribution separating filter layer. Thus as in the cases of $PbO_2$, in cases where an energy subtraction image is formed from the image signals having been detected from the two surfaces of the stimulable phosphor sheet, it often occurs that an energy subtraction image having good image quality cannot be obtained and a medical diagnosis cannot be made accurately.

SUMMARY OF THE INVENTION

The primary object of the present invention is to provide a stimulable phosphor sheet, wherein an energy distribution separating filter layer, which is chemically stable, which has a high capability of separating energy distributions, and which acts such that an energy subtraction image having good image quality is capable of being obtained from energy subtraction processing, is employed as an intermediate layer between stimulable phosphor layers.

The present invention provides a first stimulable phosphor sheet, comprising:

i) an intermediate layer constituted of a substance, which absorbs low energy components of radiation and transmits at least light having predetermined wavelengths, and ii) stimulable phosphor layers, which are overlaid respectively on two surfaces of the intermediate layer, wherein the substance contains a bismuth compound.

In the first stimulable phosphor sheet in accordance with the present invention, the bismuth compound should preferably contain at least one compound selected from the group consisting of halides of bismuth, oxides of bismuth, and the like. For example, the bismuth compound should preferably contain at least one compound selected from the group consisting of $BiF_3$ (bismuth fluoride), $BiOCl$ (bismuth oxychloride), $Bi_2(WO_4)_3$ (bismuth tungstate), $Bi_{12}GeO_{20}$ (BGO), and $Bi_{12}SiO_{20}$ (BSO). As the bismuth compound, one of the above-enumerated bismuth compounds may be used alone. Alternatively, two or more of the above-enumerated bismuth compounds may be used in combination. Also, the substance, which absorbs low energy components of radiation and transmits at least light having predetermined wavelengths, may contain a substance other than the bismuth compound.

The present invention also provides a second stimulable phosphor sheet, comprising:

i) an intermediate layer constituted of a substance, which absorbs low energy components of radiation and transmits at least light having predetermined wavelengths, and ii) stimulable phosphor layers, which are overlaid respectively on two surfaces of the intermediate layer, wherein the substance contains at least one lead compound selected from the group consisting of $PbF_2$ (lead fluoride), $2PbCO_3 \cdot Pb(OH)_2$ (basic lead carbonate), $PbTe$ (lead telluride), and $PbWO_4$ (lead tungstate).

In the second stimulable phosphor sheet in accordance with the present invention, the substance, which absorbs low energy components of radiation and transmits at least light having predetermined wavelengths, may contain one of the above-enumerated lead compounds alone. Alternatively, the substance, which absorbs low energy components of radiation and transmits at least light having predetermined wavelengths, may contain two or more of the above-enumerated lead compounds in combination. Also, the substance, which absorbs low energy components of radiation and transmits at least light having predetermined wavelengths, may contain a substance other than the lead compound.

As described above, each of the first and second stimulable phosphor sheets in accordance with the present invention comprises the intermediate layer and the stimulable phosphor layers respectively overlaid on the two surfaces of the intermediate layer. The first and second stimulable phosphor sheets in accordance with the present invention may also be provided with other layers having functions for a protective layer, an adhesion layer, a light reflecting layer, and the like.

Also, in the first and second stimulable phosphor sheets in accordance with the present invention, besides the substance, which absorbs low energy components of radiation and transmits at least light having predetermined wavelengths, the intermediate layer may contain other substances having other functions, such that the functions of the substance, which absorbs low energy components of radiation and transmits at least light having predetermined wavelengths, are not affected adversely. For example, the intermediate layer may also act as a substrate for the stimulable phosphor sheet.

The term "substance absorbing low energy components of radiation" as used herein means the substance, which absorbs more of the low energy components of radiation than high energy components of the radiation. The definition of which energy components of radiation fall within the range of the low energy components of the radiation and which energy components of the radiation fall within the range of the high energy components of the radiation depends upon whether the radiation is utilized in a medical field or other fields. Also, in the medical field, the aforesaid definition depends upon image recording conditions, objects, radiation sources, and the like. Energy components of certain levels are defined as the low energy components in certain cases and are defined as the high energy components in the other cases. For example, as for the recording of ordinary chest images utilized in the medical field, the definition is roughly made such that the energy components of levels falling within the range of 10 keV to 50 keV are the low energy components and the energy components of levels falling within the range of 40 keV to 120 keV or higher are the high energy components.

The term "light having predetermined wavelengths" as used herein means the light having wavelengths falling within the wavelength range of the stimulating rays, with which the stimulable phosphor sheet is scanned ordinarily, the wavelength range of the stimulating rays is from 500 nm to 800 nm. Such that the substance, which absorbs low energy components of radiation and transmits at least light having predetermined wavelengths, may not absorb the light emitted by the stimulable phosphor sheet, the substance should preferably be capable of transmitting light having wavelengths falling within the range of 300 nm to 800 nm.

The first and second stimulable phosphor sheets in accordance with the present invention should preferably be utilized for an energy subtraction processing technique.

The energy subtraction processing technique is a technique for processing radiation images, wherein a plurality of radiation images of a single object are formed with radiation having different energy distributions by utilizing the characteristics such that a specific structure of the object has different levels of radiation absorptivity with respect to the radiation having different energy distributions. Thereafter, a plurality of radiation image signals, which represent the radiation images of the object, are weighted, and the weighted image signals are subtracted from each other. A subtraction image signal is thus obtained, and an image, in which only the pattern of the specific structure of the object is illustrated or enhanced, is obtained from the subtraction image signal. (The energy subtraction processing technique is described in, for example, Japanese Unexamined Patent Publication Nos. 57(1982)-045475 and 59(1984)-083486.)

By way of example, the energy subtraction processing technique may be performed in the manner described below. Specifically, radiation is irradiated to an object, and radiation images of the object are stored on stimulable phosphor layers of a stimulable phosphor sheet, which comprises a substrate and the stimulable phosphor layers overlaid respectively on two surfaces of the substrate, such that image information of the object is formed on the stimulable phosphor layer, which is formed on the substrate surface opposite to the object, with radiation, in which low energy components of the radiation have been reduced at a region corresponding to a specific structure of the object to a level lower than in the radiation impinging upon the stimulable phosphor layer formed on the substrate surface on the side of the object. Thereafter, stimulating rays having predetermined wavelengths are caused to scan one surface of the stimulable phosphor sheet, and light emitted from one of the stimulable phosphor layers of the stimulable phosphor sheet and light emitted from the other stimulable phosphor layer are photoelectrically detected from the two surfaces of the stimulable phosphor sheet. In this manner, two digital image signals, which respectively represent the radiation images having been stored on the stimulable phosphor layers of the stimulable phosphor sheet, are obtained. The image signal components of the two digital image signals, which image signal components represent corresponding pixels in the two radiation images, are then subtracted from each other, and a difference signal is thereby obtained which represents the image of the specific structure of the object represented by the radiation images. The energy subtraction processing technique performed in the manner described above is disclosed in, for example, Japanese Unexamined Patent Publication No. 6(1994)-130197.

In the subtraction process performed on the digital image signals, the image signal components of the digital image signals, which image signal components represent corresponding pixels in the radiation images, are weighted by being multiplied by weight factors, and the thus weighted image signals components are subtracted from each other to obtain the difference signal.

Each of the first and second stimulable phosphor sheets in accordance with the present invention comprises the intermediate layer constituted of the substance, which absorbs low energy components of radiation and transmits at least light having predetermined wavelengths, and the stimulable phosphor layers, which are overlaid respectively on the two surfaces of the intermediate layer. The substance contains the bismuth compound, which is chemically stable, or at least one lead compound, which is chemically stable and is selected from the group consisting of $PbF_2$, $2PbCO_3.Pb(OH)_2$, $PbTe$, and $PbWO_4$. Therefore, with the first and second stimulable phosphor sheets in accordance with the present invention, the problems do not occur in that the substance decomposes little by little and the intermediate layer becomes colored. The substance undergoes little chemical change with the passage of time. Accordingly, the problems do not occur in that the substance absorbs a laser beam acting as the stimulating rays or the light emitted by the stimulable phosphor sheet. As a result, the problems do not occur in that a stimulable phosphor layer of the stimulable phosphor sheet (in particular, the stimulable phosphor layer formed on the surface of the intermediate layer, which surface is opposite to the stimulating ray irradiation side surface of the intermediate layer) cannot be stimulated sufficiently, or that the light emitted by the stimulable phosphor sheet does not emanate sufficiently from the surface of the stimulable phosphor sheet. Thus the first and second stimulable phosphor sheets in accordance with the present invention undergo little change in characteristics with respect to the stimulating rays and the light, which is emitted by the stimulable phosphor sheet.

Also, in cases where $TiO_2$ is employed in the intermediate layer, the problems occur in that, if the thickness of the intermediate layer is small, a high capability of separating energy distributions cannot be obtained. However, the bismuth compound or the lead compound, which is selected from the group consisting of $PbF_2$, $2PbCO_3.Pb(OH)_2$, $PbTe$, and $PbWO_4$, has a high capability of separating energy distributions. Therefore, with the first and second stimulable phosphor sheets in accordance with the present invention, even if the thickness of the intermediate layer is small, a high capability of separating energy distributions can be obtained. Accordingly, the thickness of the intermediate layer need not be set at a large value in order to obtain a high capability of separating energy distributions. As a result, the problems can be prevented from occurring in that the laser beam cannot readily reach the stimulable phosphor layer formed on the surface of the intermediate layer, which surface is opposite to the stimulating ray irradiation side surface of the intermediate layer, and light having a high intensity cannot be emitted from the stimulable phosphor layer formed on the surface of the intermediate layer, which surface is opposite to the stimulating ray irradiation side surface of the intermediate layer. Further, the problems can be prevented from occurring in that the laser beam diffuses markedly when the laser beam passes through the intermediate layer having a large thickness.

Accordingly, with the first and second stimulable phosphor sheets in accordance with the present invention, in cases where an energy subtraction image is formed from the image signals having been detected from the two surfaces of the stimulable phosphor sheet, an energy subtraction image having good image quality with a high sharpness can be obtained.

The present invention will hereinbelow be described in further detail with reference to the accompanying drawings.

DETAILED DESCRIPTION OF THE INVENTION

Figure 1:
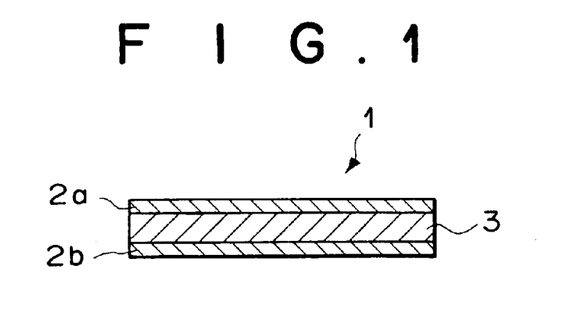
FIG. 1 is a sectional view showing a first embodiment of the stimulable phosphor sheet in accordance with the present invention.

FIG. 1 is a sectional view showing a first embodiment of the stimulable phosphor sheet in accordance with the present invention. With reference to FIG. 1, a stimulable phosphor sheet 1 comprises an intermediate layer 3 constituted of a substance, which absorbs low energy components of radiation and transmits light having predetermined wavelengths (in this embodiment, stimulating rays for stimulating stimulable phosphor layers). The stimulable phosphor sheet 1 also comprises stimulable phosphor layers 2a and 2b, which are overlaid respectively on two surfaces of the intermediate layer 3. As illustrated in FIG. 1, in cases where the intermediate layer 3 has functions for a substrate, the stimulable phosphor sheet 1 need not be provided with a substrate. As in a stimulable phosphor sheet 1' illustrated in FIG. 2, in cases where the intermediate layer 3 does not have the functions for a substrate, a transparent substrate 4 should preferably be formed on the bottom surface of the stimulable phosphor layer 2b.

The intermediate layer 3 is constituted of the substance, which absorbs low energy components of radiation and transmits at least the light having predetermined wavelengths. The substance constituting the intermediate layer 3, which substance absorbs low energy components of radiation and transmits at least the light having predetermined wavelengths, contains a bismuth compound or at least one lead compound, which is selected from the group consisting of $PbF_2$, $2PbCO_3 \cdot Pb(OH)_2$, $PbTe$, and $PbWO_4$. The bismuth compound should preferably contain at least one compound selected from the group consisting of $BiF_3$, $BiOCl$, $Bi_2(WO_4)_3$, $Bi_{12}GeO_{20}$, and $Bi_{12}SiO_{20}$.

The intermediate layer 3 may be constituted of only the substance, which absorbs low energy components of radiation and transmits at least the light having predetermined wavelengths. Alternatively, the intermediate layer 3 may be constituted of a different kind of substance, e.g. a binder or a solvent, and the substance, which absorbs low energy components of radiation and transmits at least the light having predetermined wavelengths and which is dispersed in the different kind of substance. Examples of the binders, which may be employed in the intermediate layer 3, include polymers, typically natural high-molecular weight substances, e.g., proteins, such as gelatin, and polysaccharides, such as dextran; and synthetic high-molecular weight substances, such as a polyvinyl butyral, a polyvinyl acetate, ethyl cellulose, a vinylidene chloride-vinyl chloride copolymer, a vinyl chloride-vinyl acetate copolymer, cellulose acetate butyrate, a polyvinyl alcohol, a linear polyester, a polystyrene, and an epoxy resin.

Examples of the solvents, which may be employed in the intermediate layer 3, include lower alcohols, such as methyl alcohol, ethyl alcohol, n-propyl alcohol, and n-butyl alcohol; chlorine atom-containing hydrocarbons, such as methylene chloride and ethylene chloride; ketones, such as acetone, methyl ethyl ketone, and methyl isopropyl ketone; esters of lower fatty acids with lower alcohols, such as methyl acetate, ethyl acetate, and butyl acetate; ethers, such as dioxane, ethylene glycol monoethyl ether, and ethylene glycol monomethyl ether; and mixtures of two or more of the above-enumerated solvents.

The mixing ratio (weight ratio) of the bismuth compound or the lead compound, which is selected from the group consisting of $PbF_2$, $2PbCO_3 \cdot Pb(OH)_2$, $PbTe$, and $PbWO_4$, to the binder in a coating composition for forming the intermediate layer 3 is selected from the range between 1:1 and 50:1, and should preferably be selected from the range between 3:1 and 15:1. The thickness of the intermediate layer 3 may fall within the range of 150 μm to 900 μm. The thickness of the intermediate layer 3 should preferably fall within the range of 250 μm to 750 μm, and should more preferably fall within the range of 350 μm to 600 μm.

As the stimulable phosphor in the stimulable phosphor layer 2a or the stimulable phosphor layer 2b, a stimulable phosphor should preferably be employed which has the characteristics such that, when the stimulable phosphor is exposed to the stimulating rays having wavelengths falling within the range of 400 nm to 900 nm, the stimulable phosphor emits light having wavelengths falling within the range of 300 nm to 500 nm. Examples of such stimulable phosphors are described in detail in Japanese Unexamined Patent Publication Nos. 2(1990)-193100 and 4(1992)-310900. An europium activated alkaline earth metal halide phosphor, a cerium activated alkaline earth metal halide phosphor, and a cerium activated rare earth element oxyhalide phosphor are particularly preferable. The stimulable phosphor employed in the stimulable phosphor layer 2a and the stimulable phosphor employed in the stimulable phosphor layer 2b may be identical with each other or may be different from each other. Ordinarily, the same kind of stimulable phosphor is employed in both the stimulable phosphor layers 2a and 2b. Alternatively, stimulable phosphors, which have different compositions and which are capable of being stimulated by stimulating rays having wavelengths falling within an identical wavelength range and emit the light having wavelengths falling within an identical wavelength range, may be respectively employed in the stimulable phosphor layers 2a and 2b. Such that diffusion of the stimulating rays may be avoided, an anisotropic stimulable phosphor sheet, in which the stimulable phosphor layer is divided by partition walls into fine cells along the plane direction of the stimulable phosphor sheet, may be employed. The anisotropic stimulable phosphor sheet is described in, for example, Japanese Unexamined Patent Publication Nos. 59(1984)-202100 and 62(1987)-36599.

The thickness of the stimulable phosphor layer 2a and the thickness of the stimulable phosphor layer 2b may be identical with each other or may be different from each other. The thickness of one stimulable phosphor layer may fall within the range of 50 μm to 300 μm, and should preferably fall within the range of 100 μm to 200 μm.

Figure 2:
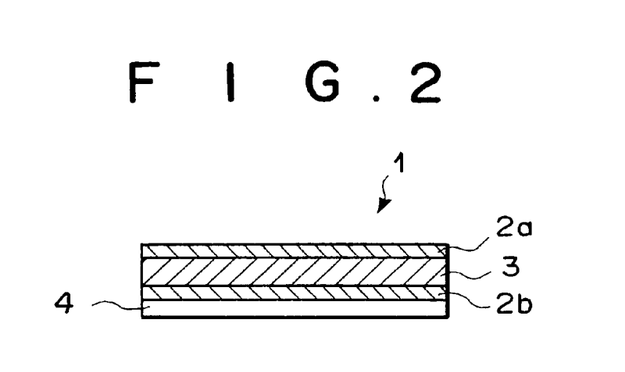
FIG. 2 is a sectional view showing a second embodiment of the stimulable phosphor sheet in accordance with the present invention.

Ordinarily, the optically transparent substrate 4 may be constituted of a transparent plastic film (or sheet). The plastic material for the transparent substrate 4 may be selected from various known materials, such as a polyethylene terephthalate, a polyethylene naphthalate, a polyamide, a polyimide, and an aramid resin. However, the material for the transparent substrate 4 is not limited to the above-enumerated materials. The transparent substrate 4 should preferably be constituted of a plastic film having a sufficient strength and a high transparency. Ordinarily, the thickness of the plastic film should preferably fall within the range of 10 µm to 100 µm.

In cases where the transparent substrate 4 is formed, a protective film should preferably be formed on the surface of the stimulable phosphor layer 2a on the side opposite to the stimulable phosphor layer 2b which is provided with the transparent substrate 4. In cases where the intermediate layer 3 has the functions for a substrate and no particular substrate is provided, protective films should preferably be formed on the surfaces of both the stimulable phosphor layers 2a and 2b. Such that the protective film may not adversely affect the incidence of the stimulating rays and the emanation of the light emitted by the stimulable phosphor sheet, the protective film should preferably be transparent. Also, such that the protective film can sufficiently protect the stimulable phosphor layer from physical impacts and chemical attacks given from the exterior, the protective film should preferably be chemically stable and have a high physical strength.

The protective film may be formed on the stimulable phosphor layer with, for example, a technique, wherein a plastic film is prepared previously and is then adhered to the surface of the stimulable phosphor layer with an adhesive agent. Alternatively, the protective film may be formed on the stimulable phosphor layer with a technique, wherein a coating composition containing a protective film material is applied onto the surface of the stimulable phosphor layer and is then dried. A fine particle filler may be contained in the protective layer in order to reduce interference nonuniformity and enhance the image quality of the radiation image. Examples of resins appropriate for the production of the light-permeable plastic film include polyester resins, such as a polyethylene terephthalate and a polyethylene naphthalate; and cellulose ester derivatives, such as cellulose triacetate. For the production of the light-permeable plastic film, various resin materials, such as a polyolefin and a polyamide, may also be employed. Ordinarily, the thickness of the protective film may be at most 30 µm. The thickness of the protective film should preferably fall within the range of 1 µm to 15 µm, and should more preferably fall within the range of 5 µm to 12 µm.

How the radiation images are recorded on the stimulable phosphor sheet 1 shown in FIG. 1 and how an energy subtraction image is obtained with the energy subtraction processing technique will be described hereinbelow with reference to FIGS. 3 and 4.

Figure 3:
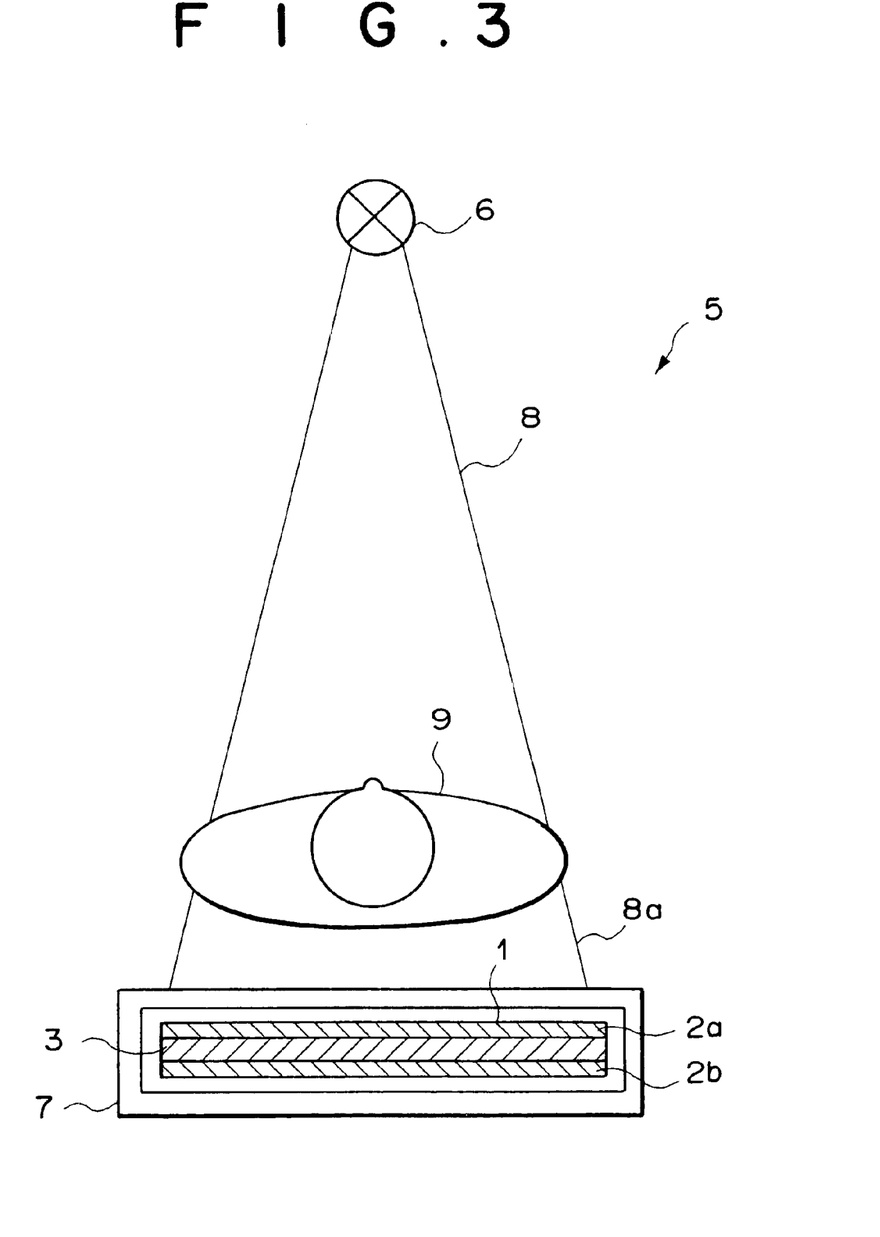
FIG. 3 is a schematic view showing an example of an X-ray image recording apparatus.

FIG. 3 is a schematic view showing an example of an X-ray image recording apparatus. In an X-ray image recording apparatus 5 shown in FIG. 3, an X-ray source 6 and a cassette 7, in which the stimulable phosphor sheet 1 is accommodated, stand facing each other. An object 9 containing a specific structure, which has radiation energy absorption characteristics different from the radiation energy absorption characteristics of the other parts of the object 9, intervenes between the X-ray source 6 and the cassette 7. X-rays 8 are produced by the X-ray source 6. The X-rays 8 pass through the object 9 containing the specific structure, which has radiation energy absorption characteristics different from the radiation energy absorption characteristics of the other parts of the object 9. X-rays 8a, which have passed through the object 9, impinge upon the stimulable phosphor layer 2a. In this manner, an X-ray image of the object 9 is stored on the stimulable phosphor layer 2a. The X-rays 8a further pass through the stimulable phosphor layer 2a and then pass through the intermediate layer 3 containing the substance, which absorbs the low energy components of radiation. Therefore, the X-rays having passed through the stimulable phosphor layer 2a and the intermediate layer 3 have an energy distribution, in which the low energy components of the X-rays 3a have been reduced and the high energy components have been emphasized. Thereafter, the X-rays, which have passed through the intermediate layer 3, impinge upon the stimulable phosphor layer 2b. Therefore, an X-ray image of the object 9 is stored on the stimulable phosphor layer 2b with the X-rays, in which the low energy components have been reduced. In this manner, two X-ray images, in which different images of the specific structure of the object 9 are embedded, are simultaneously stored on the two stimulable phosphor layers 2a and 2b.

Figure 4:
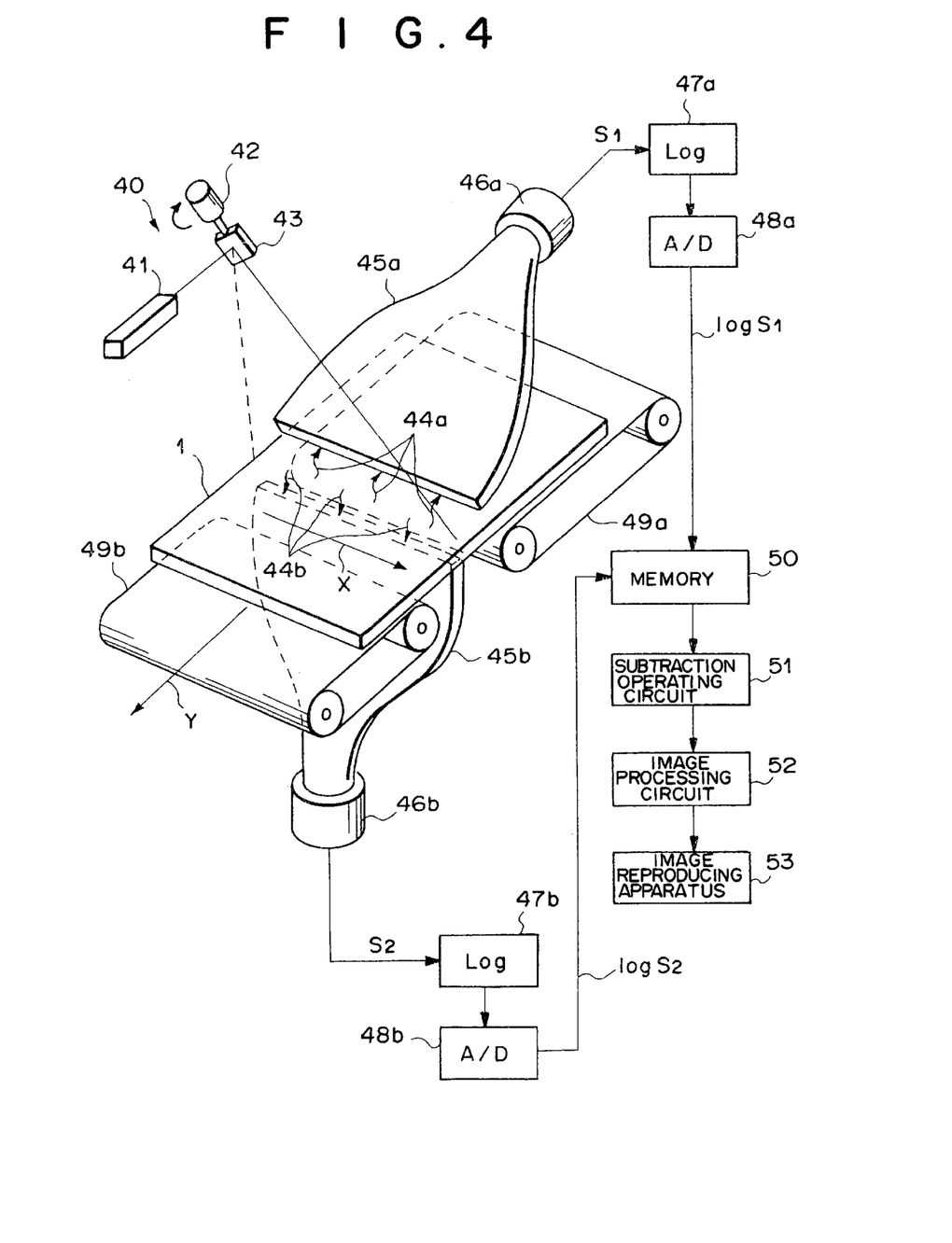
FIG. 4 is a schematic view showing an example of an X-ray image read-out apparatus for reading out X-ray images from the stimulable phosphor sheet.

FIG. 4 is a schematic view showing an example of an X-ray image read-out apparatus 40 for reading out the X-ray images from the stimulable phosphor sheet 1, on which the X-ray images have been stored in the manner described above. With reference to FIG. 4, the stimulable phosphor sheet 1 is placed on endless belts 49a and 49b, which are rotated by motors (not shown). A laser beam source 41, a scanning mirror 43, and a motor 42 are located above the stimulable phosphor sheet 1. The laser beam source 41 produces a laser beam acting as stimulating rays having predetermined wavelengths, which stimulating rays cause the stimulable phosphor sheet 1 to emit light in proportion to the amount of energy stored thereon during its exposure to the X-rays. The laser beam is capable of passing through the intermediate layer 3 of the stimulable phosphor sheet 1. The scanning mirror 43 reflects and deflects the laser beam, which has been produced by the laser beam source 41. Thus the scanning mirror 43 causes the laser beam to scan the stimulable phosphor sheet 1 in a main scanning direction indicated by the arrow X. The motor 42 rotates the scanning mirror 43. A light guide member 45a is located above and close to the position on the stimulable phosphor sheet 1, which position is being scanned with the laser beam. The light guide member 45a collects light 44a, which is emitted from the upper surface side of the stimulable phosphor sheet 1 when the stimulable phosphor sheet 1 is scanned with the laser beam, from above the stimulable phosphor sheet 1. Also, a light guide member 45b is located below the position on the stimulable phosphor sheet 1, which position is being scanned with the laser beam. The light guide member 45b is located perpendicularly to the stimulable phosphor sheet 1 and collects light 44b, which is emitted from the lower surface side of the stimulable phosphor sheet 1 when the stimulable phosphor sheet 1 is scanned with the laser beam, from below the stimulable phosphor sheet 1. The light guide member 45a is located such that it may be in close contact with a photomultiplier 46a, which photoelectrically detects the light 44a emitted by the stimulable phosphor sheet 1. Also, the light guide member 45b is located such that it may be in close contact with a photomultiplier 46b, which photoelectrically detects the light 44b emitted by the stimulable phosphor sheet 1. The photomultipliers 46a and 46b are respectively connected to logarithmic amplifiers 47a and 47b. The logarithmic amplifiers 47a and 47b are respectively connected to analog-to-digital converters 48a and 48b. The analog-to-digital converters 48a and 48b are connected to a memory 50.

How the X-ray images are read out from the stimulable phosphor sheet 1 in the X-ray image read-out apparatus 40 will be described hereinbelow with reference to FIG. 4. In the X-ray image recording apparatus 5 shown in FIG. 3, the X-ray images of the object 9 are stored on the stimulable phosphor sheet 1. The stimulable phosphor sheet 1, on which the X-ray images have been stored, is set at a predetermined position on the endless belts 49a and 49b. The stimulable phosphor sheet 1, which has been set at the predetermined position, is conveyed by the endless belts 49a and 49b in a sub-scanning direction indicated by the arrow Y. Also, the laser beam is produced by the laser beam source 41. The laser beam, which has been produced by the laser beam source 41, is reflected and deflected by the scanning mirror 43, which is quickly rotated by the motor 42 in the direction indicated by the arrow. The laser beam, which has thus been reflected and deflected by the scanning mirror 43, impinges upon the stimulable phosphor sheet 1 and scans it in the main scanning direction indicated by the arrow X. The main scanning direction is approximately normal to the sub-scanning direction indicated by the arrow Y. When the stimulable phosphor sheet 1 is exposed to the laser beam, the exposed portion of the stimulable phosphor sheet 1 emits light in proportion to the amount of energy stored thereon during its exposure to the radiation. The light 44a is emitted upwardly by the stimulable phosphor sheet 1. The light 44b is emitted downwardly by the stimulable phosphor sheet 1. Since the intermediate layer 3 of the stimulable phosphor sheet 1 transmits the stimulating rays, and the stimulating rays impinge upon the stimulable phosphor layer 2b, which is formed under the intermediate layer 3, the light 44b is thus emitted from the lower surface side of the stimulable phosphor sheet 1. The emitted light 44a is guided by the light guide member 45a and is photoelectrically detected by the photomultiplier 46a. The light guide member 45a is made from a light guiding material, such as an acrylic plate. The light guide member 45a has a linear input end face, which is located such that it may extend along the main scanning line on the stimulable phosphor sheet 1, and a ring-like output end face, which is located such that it may be in close contact with a light receiving face of the photomultiplier 46a. The emitted light 44a, which has entered from the input end face into the light guide member 45a, is guided through repeated total reflection inside of the light guide member 45a, emanates from the output end face, and is received by the photomultiplier 46a. The intensity of the emitted light 44a representing the X-ray image is converted by the photomultiplier 46a into an electric signal. In the same manner as that in the emitted light 44a, the light 44b is guided by the light guide member 45b and is photoelectrically detected by the photomultiplier 46b.

The photomultiplier 46a generates an analog output signal $S_1$. The analog output signal $S_1$ is logarithmically amplified by the logarithmic amplifier 47a and is then digitized by an analog-to-digital converter 48a into a first image signal log $S_1$. The first image signal log $S_1$ is fed into the memory 50. Also, the photomultiplier 46b generates an analog output signal $S_2$. The analog output signal $S_2$ is logarithmically amplified by the logarithmic amplifier 47b and is then digitized by an analog-to-digital converter 48b into a second image signal log $S_2$. The first image signal log $S_1$ and the second image signal log $S_2$ are temporarily stored in the memory 50.

Thereafter, the first image signal log $S_1$ and the second image signal log $S_2$ are read from the memory 50 and fed into a subtraction operating circuit 51.

The subtraction operating circuit 51 performs exponential conversion on the first image signal log $S_1$ and the second image signal log $S_2$ and restores the image signals $S_1$ and $S_2$. The image signals $S_1$ and $S_2$ are weighted with appropriate weight factors. The image signal components of the weighted image signals $S_1$ and $S_2$, which image signal components represent corresponding pixels in the X-ray images, are then subtracted from each other. In this manner, a digital difference signal Ssub is calculated with the formula $$Ssub = a \cdot S_1 - b \cdot S_2 + c$$

wherein a and b represent the weight factors, and c represents the bias component.

In an image processing circuit 52, the difference signal Ssub is again logarithmically converted and subjected to image processing, such as gradation processing or frequency processing. The difference signal Ssub, which has been obtained from the image processing circuit 52, is fed into an image reproducing apparatus 53, which is connected to the X-ray image read-out apparatus 40. In the image reproducing apparatus 53, the difference signal Ssub is used for reproducing a visible X-ray image. The image reproducing apparatus 53 may be constituted of a display means, such as a CRT display device, or a light beam scanning recording apparatus for recording an image on photographic film. The image reproducing apparatus 53 may be replaced by an apparatus for storing the image signal in an image file on an optical disk, a magnetic disk, or the like, such that the image signal may then be fed into the display means or the light beam scanning recording apparatus.

In this embodiment, the digital image signal is processed as logarithmic values. In such cases, the band compression of the image signal can be effected, and unnecessary image information can be removed perfectly. Alternatively, the same processing may be carried out on the original image signal, which has not been converted into logarithmic values.

In cases where the weight factors a and b, which are used in the subtracting operation, are set appropriately, the difference signal Ssub, in which the signal components corresponding to parts other than the specific structure in the object have been erased, can be obtained. Therefore, a radiation image of only the specific structure of the object can be reproduced from the difference signal Ssub.

The present invention will further be illustrated by the following non-limitative examples.

EXAMPLE 1

Stimulable phosphor layers were formed in the manner described below. Specifically, 200 g of particles of a bivalent europium activated barium fluorobromide stimulable phosphor ($BaFBr:Eu^{+2}$), 40 g of a solution containing 20% by weight of a polyurethane resin (Pandex T5265M, supplied by Dainippon Ink and Chemicals, Inc.) in methyl ethyl ketone, and 2 g of a bisphenol A type of epoxy resin were added to methyl ethyl ketone. The resulting mixture was subjected to a dispersing process, which was performed with a propeller mixer. In this manner, a coating composition for forming a stimulable phosphor layer, in which the mixing ratio (weight ratio) of the binder to the stimulable phosphor particles was 1:20, was prepared. The thus prepared coating composition was uniformly applied with a doctor blade onto a polyethylene terephthalate sheet having a thickness of 250 $\mu$m (i.e., a temporary substrate, whose surface had been coated with a releasing agent), which was placed horizontally on a glass plate and adhered to the glass plate. Thereafter, the temporary substrate, on which the coating film had been formed, was introduced into a dryer. The temperature in the dryer was raised little by little from 25° C. to 100° C. in order to dry the coating film, and a stimulable phosphor layer was thereby formed. The thus formed stimulable phosphor layer was then separated from the polyethylene terephthalate sheet, and a stimulable phosphor layer A having a thickness of 200 μm was obtained. Also, in the same manner as that described above, a stimulable phosphor layer B having a thickness of 150 μm was obtained from the same coating composition for forming a stimulable phosphor layer.

An intermediate layer was formed in the manner described below. Specifically, 200 g of $PbF_2$ particles, 40 g of a solution containing 20% by weight of a polyurethane resin (Pandex T5265M, supplied by Dainippon Ink and Chemicals, Inc.) in methyl ethyl ketone, and 2 g of a bisphenol A type of epoxy resin were added to methyl ethyl ketone. The resulting mixture was subjected to a dispersing process, which was performed with a propeller mixer. In this manner, a coating composition for forming an intermediate layer, in which the mixing ratio (weight ratio) of the binder to the $PbF_2$ particles was 1:20, was prepared. The thus prepared coating composition was uniformly applied with a doctor blade onto a polyethylene terephthalate sheet having a thickness of 250 μm (i.e., a temporary substrate, whose surface had been coated with a releasing agent), which was placed horizontally on a glass plate and adhered to the glass plate. Thereafter, the temporary substrate, on which the coating film had been formed, was introduced into a dryer. The temperature in the dryer was raised little by little from 25° C. to 100° C. in order to dry the coating film. The thus dried coating film was then separated from the polyethylene terephthalate sheet, and an intermediate layer having a thickness of 100 μm was obtained.

Thereafter, an adhesive layer (thickness: 20 μm) constituted of a polyester resin was formed on a 250 μm-thick transparent polyethylene terephthalate sheet acting as a substrate. The stimulable phosphor layer B having been obtained in the manner described above was then overlaid on the adhesive layer, such that the surface of the stimulable phosphor layer B, which surface was in contact with the polyethylene terephthalate sheet acting as the temporary substrate when the stimulable phosphor layer B was formed on the temporary substrate, stood facing up. The intermediate layer having been obtained in the manner described above was then over laid on the stimulable phosphor layer B. Thereafter, the stimulable phosphor layer A having been obtained in the manner described above was overlaid on the intermediate layer, such that the surface of the stimulable phosphor layer A, which surface was in contact with the polyethylene terephthalate sheet acting as the temporary substrate when the stimulable phosphor layer A was formed on the temporary substrate, stood facing down. The thus obtained combination of the layers was then heated (at a temperature of at least 60° C., which is the softening temperature of the binder), and a pressure was applied to the combination of the layers. In this manner, a stimulable phosphor sheet provided with the substrate was formed. A 10 μm-thick polyethylene terephthalate layer (provided with an adhesive agent) acting as a protective layer was then overlaid on the surface of the stimulable phosphor layer A of the stimulable phosphor sheet.

EXAMPLES 2 TO 11

Stimulable phosphor sheets were formed in the same manner as that in Example 1, except that the thickness of the intermediate layer was set at 200 μm (in Example 2), 300 μm (in Example 3), 400 μm (in Example 4), 500 μm (in Example 5), 600 μm (in Example 6), 700 μm (in Example 7), 800 μm (in Example 8), 900 μm (in Example 9), 1,000 μm (in Example 10), and 1,100 μm (in Example 11).

EXAMPLE 12

A stimulable phosphor sheet was formed in the same manner as that in Example 1, except that $2PbCO_3.Pb(OH)_2$ particles were employed in the intermediate layer in lieu of the $PbF_2$ particles, and the thickness of the intermediate layer was set at 500 μm.

EXAMPLE 13

A stimulable phosphor sheet was formed in the same manner as that in Example 1, except that PbTe particles were employed in the intermediate layer in lieu of the $PbF_2$ particles, and the thickness of the intermediate layer was set at 500 μm.

EXAMPLE 14

A stimulable phosphor sheet was formed in the same manner as that in Example 1, except that $PbWO_4$ particles were employed in the intermediate layer in lieu of the $PbF_2$ particles, and the thickness of the intermediate layer was set at 500 μm.

EXAMPLE 15

A stimulable phosphor sheet was formed in the same manner as that in Example 1, except that $BiF_3$ particles were employed in the intermediate layer in lieu of the $PbF_2$ particles, and the thickness of the intermediate layer was set at 500 μm.

EXAMPLE 16

A stimulable phosphor sheet was formed in the same manner as that in Example 1, except that BiOCl particles were employed in the intermediate layer in lieu of the $PbF_2$ particles, and the thickness of the intermediate layer was set at 500 μm.

EXAMPLE 17

A stimulable phosphor sheet was formed in the same manner as that in Example 1, except that $Bi_2(WO_4)_3$ particles were employed in the intermediate layer in lieu of the $PbF_2$ particles, and the thickness of the intermediate layer was set at 500 μm.

EXAMPLE 18

A stimulable phosphor sheet was formed in the same manner as that in Example 1, except that $Bi_{12}GeO_{20}$ particles were employed in the intermediate layer in lieu of the $PbF_2$ particles, and the thickness of the intermediate layer was set at 500 μm.

EXAMPLE 19

A stimulable phosphor sheet was formed in the same manner as that in Example 1, except that $Bi_{12}SiO_{20}$ particles were employed in the intermediate layer in lieu of the $PbF_2$ particles, and the thickness of the intermediate layer was set at 500 μm.

COMPARATIVE EXAMPLE 1

A stimulable phosphor sheet was formed in the same manner as that in Example 1, except that $PbO_2$ particles were employed in the intermediate layer in lieu of the $PbF_2$ particles, and the thickness of the intermediate layer was set at 500 μm.

COMPARATIVE EXAMPLE 2

A stimulable phosphor sheet was formed in the same manner as that in Example 1, except that $TiO_2$ particles were employed in the intermediate layer in lieu of the PbF$_2$ particles, and the thickness of the intermediate layer was set at 500 μm.

[Evaluating Method]

Images of a phantom containing a bone were recorded on each stimulable phosphor sheet at a tube voltage of 120 kV, and the images were then read out from the stimulable phosphor sheet. In this manner, an image signal representing a stimulating ray irradiation surface side image and an image signal representing the opposite surface side image were obtained. The two image signals were then subtracted from each other, and a difference signal representing a subtraction image, in which a bone image pattern had been erased, was thereby obtained. The subtraction image was then reproduced on film from the difference signal. In order for the stimulable phosphor sheet to be evaluated, a judgment was made as to whether the capability of separating energy distributions was high or low. (In cases where the capability of separating energy distributions was low, the bone image pattern remained in the subtraction image, and an image suitable as the subtraction image could not be obtained.) Also, after the stimulable phosphor sheet was formed, the stimulable phosphor sheet was left to stand at the room temperature for one month, and a decrease in the intensity of light emitted by the stimulable phosphor sheet was investigated. (The decrease in the intensity of light emitted by the stimulable phosphor sheet was expressed with a relative value with the intensity of the emitted light, which was obtained from the stimulable phosphor sheet at the time at which the stimulable phosphor sheet was formed, being taken as 100.) The results shown in Table 1 below were obtained. In Table 1, the "○" mark indicates that the capability of separating energy distributions was high.

TABLE 1

| | Thickness of intermediate layer (μm) | Capability of separating energy distributions | Relative intensity of emitted light |
|---|---|---|---|
| Example 1 | 100 | LOW | |
| Example 2 | 200 | ○ | |
| Example 3 | 300 | ○ | |
| Example 4 | 400 | ○ | |
| Example 5 | 500 | ○ | |
| Example 6 | 600 | ○ | |
| Example 7 | 700 | ○ | |
| Example 8 | 800 | ○ | |
| Example 9 | 900 | ○ | |
| Example 10 | 1000 | LOW | 95 or more |
| Example 11 | 1100 | LOW | |
| Example 12 | 500 | ○ | |
| Example 13 | 500 | ○ | |
| Example 14 | 500 | ○ | |
| Example 15 | 500 | ○ | |
| Example 16 | 500 | ○ | |
| Example 17 | 500 | ○ | |
| Example 18 | 500 | ○ | |
| Example 19 | 500 | ○ | |
| Comp. Ex. 1 | 500 | ○ | 30 or less |
| Comp. Ex. 2 | 500 | LOW | 95 or more |

As shown in Table 1, in Examples 1 to 19, the stimulable phosphor sheets in accordance with the present invention were employed. The bismuth compounds BiF$_3$, BiOCl, Bi$_2$(WO$_4$)$_3$, Bi$_{12}$GeO$_{20}$, and Bi$_{12}$SiO$_{20}$ and the lead compounds PbF$_2$, 2PbCO$_3$.Pb(OH)$_2$, PbTe, and PbWO$_4$ were chemically stable. Therefore, in Examples 1 to 19, the stimulable phosphor sheets exhibited little change in light emission characteristics with the passage of time. Also, even if the thickness of the intermediate layer was thin, a high capability of separating energy distributions could be obtained. However, in Example 1, in which the thickness of the intermediate layer was markedly small, the bone image pattern was mixed markedly in the subtraction image, and an image suitable as the subtraction image could not be obtained. In Examples 10 and 11, in which the thickness of the intermediate layer was markedly large, the stimulating rays could not reach the stimulable phosphor layer formed on the side opposite to the stimulating ray irradiation surface side, and therefore the intensity of the light emitted from the stimulable phosphor layer formed on the side opposite to the stimulating ray irradiation surface side was markedly low. Accordingly, in Examples 10 and 11, an image signal containing much noise (having a low signal-to-noise ratio) was obtained from the stimulable phosphor layer formed on the side opposite to the stimulating ray irradiation surface side, and a subtraction image having bad graininess characteristics was obtained.

In Comparative Example 1, PbO$_2$ exhibited a high capability of separating energy distributions. However, in Comparative Example 1, PbO$_2$ was chemically unstable, and the stimulable phosphor sheet exhibited a markedly large change in light emission characteristics with the passage of time. Also, in Comparative Example 2, the stimulable phosphor sheet, in which TiO$_2$ was employed in the intermediate layer, exhibited little change in light emission characteristics with the passage of time. However, with the stimulable phosphor sheet in Comparative Example 2, the capability of separating energy distributions was low, and a subtraction image having a low sharpness was obtained.

As described above, in cases where energy subtraction images were formed with the stimulable phosphor sheets in accordance with the present invention, energy subtraction images having good image quality could be obtained.

In addition, all of the contents of Japanese Patent Application No. 11(1999)-276581 are incorporated into this specification by reference.

What is claimed is:

1. A stimulable phosphor sheet, comprising:
   i) an intermediate layer constituted of a substance, which absorbs low energy components of radiation and transmits at least light having predetermined wavelengths, wherein the thickness of the intermediate layer is within the range of 150 μm to 900 μm, and
   ii) stimulable phosphor layers, which are overlaid respectively on two surfaces of the intermediate layer,
   wherein the substance contains at least one compound selected from the group consisting of BiF$_3$, BiOCl, Bi$_2$(WO$_4$)$_3$, Bi$_{12}$GeO$_{20}$, Bi$_{12}$SiO$_{20}$, PbF$_2$, PbTe, and PbWO$_4$.

2. A stimulable phosphor sheet as defined in claim 1, wherein the at least one compound is selected from the group consisting of BiF$_3$, BiOCl, Bi$_2$(WO$_4$)$_3$, Bi$_{12}$GeO$_{20}$, and Bi$_{12}$SiO$_{20}$.

3. A stimulable phosphor sheet as defined in claim 1, wherein the intermediate layer also acts as a substrate.

4. A stimulable phosphor sheet as defined in claim 3 wherein the stimulable phosphor sheet is a stimulable phosphor sheet for use in an energy subtraction processing technique.

5. A stimulable phosphor sheet as defined in claim 1, further comprising a substrate.

6. A stimulable phosphor sheet as defined in claim 5 wherein the stimulable phosphor sheet is a stimulable phosphor sheet for use in an energy subtraction processing technique.

7. A stimulable phosphor sheet as defined in claim 1, wherein the stimulable phosphor sheet is a stimulable phosphor sheet for use in an energy subtraction processing technique.

8. The stimulable phosphor sheet as defined in claim 1, wherein the thickness of the intermediate layer is within the range of 250 μm to 750 μm.

9. The stimulable phosphor sheet as defined in claim 1, wherein the thickness of the intermediate layer is within the range of 350 μm to 600 μm.

10. The stimulable phosphor sheet as defined in claim 1, wherein the intermediate layer comprises a binder or solvent and said substance.

11. The stimulable phosphor sheet as defined in claim 10, wherein the weight ratio of the substance to the binder in the intermediate layer is between 1:1 and 50:1.

12. The stimulable phosphor sheet as defined in claim 10, wherein the weight ratio of the substance to the binder in the intermediate layer is between 3:1 and 15:1.

13. A stimulable phosphor sheet, comprising:
i) an intermediate layer comprising a substance, which absorbs low energy components of radiation and transmits at least light having predetermined wavelengths, and a binder, wherein the weight ratio of the substance to the binder in the intermediate layer is between 1:1 and 50:1, and
ii) stimulable phosphor layers, which are overlaid respectively on two surfaces of the intermediate layer,
wherein the substance contains at least one compound selected from the group consisting of $BiF_3$, $BiOCl$, $Bi_2(WO_4)_3$, $Bi_{12}GeO_{20}$, $Bi_{12}SiO_{20}$, $PbF_2$, $PbTe$, and $PbWO_4$.

* * * * *